(No Model.) 2 Sheets—Sheet 1.

G. PYE.
REAPING AND MOWING MACHINE.

No. 351,400. Patented Oct. 26, 1886.

Witnesses:
James P. DuHamel
Walter S. Dodge

Inventor:
George Pye,
by Dodger Son,
his Attys.

(No Model.) 2 Sheets—Sheet 2.
G. PYE.
REAPING AND MOWING MACHINE.

No. 351,400. Patented Oct. 26, 1886.

Witnesses:
James P. DuHamel
Walter H. Dodge

Inventor:
George Pye,
by Dodge & Son,
his Attys.

UNITED STATES PATENT OFFICE.

GEORGE PYE, OF OTTAWA, CANADA.

REAPING AND MOWING MACHINE.

SPECIFICATION forming part of Letters Patent No. 351,400, dated October 26, 1886.

Application filed September 18, 1885. Serial No. 177,469. (No model.) Patented in Canada March 30, 1881, No. 12,559.

*To all whom it may concern:*

Be it known that I, GEORGE PYE, of the city of Ottawa, in the county of Carleton, Dominion of Canada, have invented certain new and useful Improvements in Reaping and Mowing Machines, of which the following is a specification.

My invention relates to reaping and mowing machines; and it consists in various improvements and features of construction, hereinafter described, by which I am enabled to more readily and perfectly adjust the cutting mechanism, and by which the construction is otherwise simplified and improved.

Figure 1:
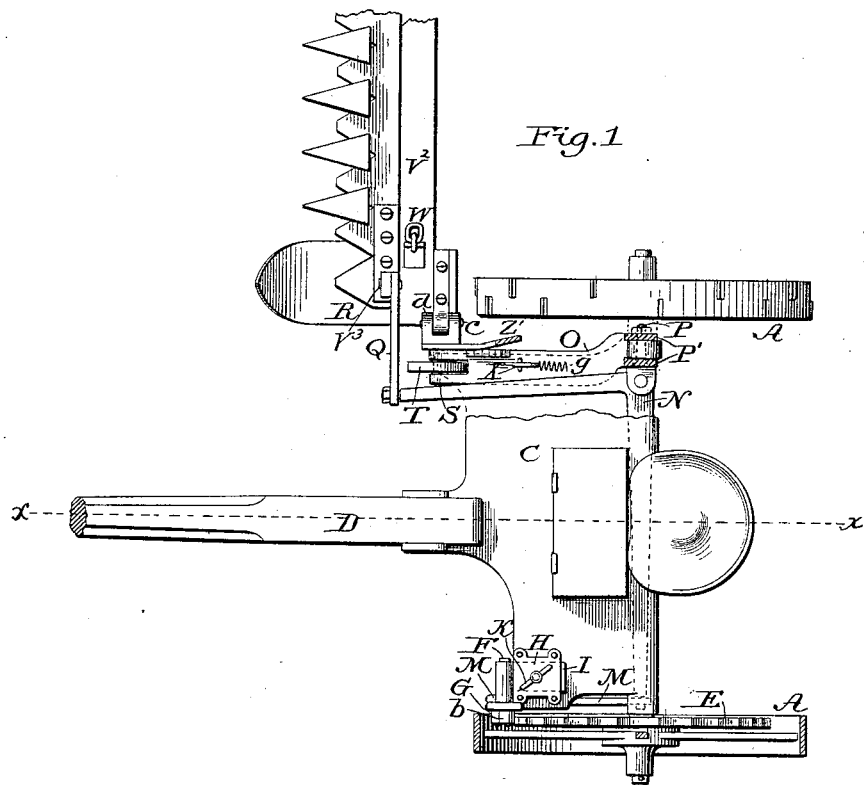
Figure 2:
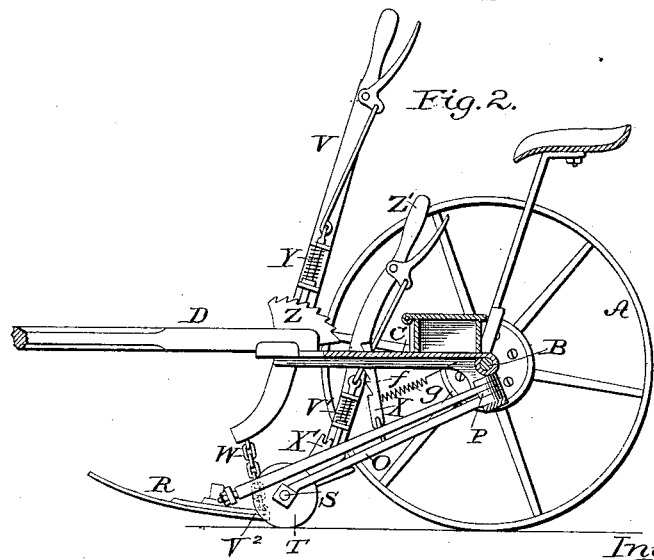
Figure 3:
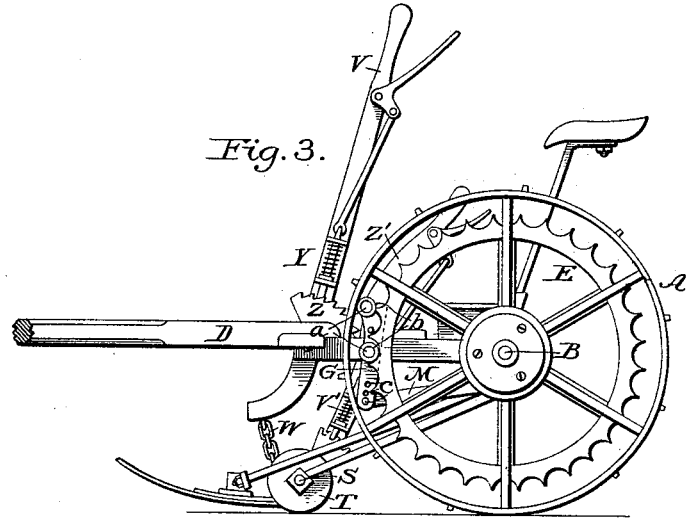

In the accompanying drawings, Figure 1 is a top plan view of my improved machine; Fig. 2, a vertical section on the line $xx$ of Fig. 1; Fig. 3, a side elevation; Figs. 4, 5, 6, 7, and 8, views illustrating certain details, hereinafter referred to.

The present invention is designed as an improvement upon the machine for which Letters Patent of the United States were granted to me bearing date the 15th day of June, 1869, and numbered 91,482.

Referring to the drawings, A A are traction or ground wheels, having ratchets and pawls mounted upon opposite ends of an axle, B, which carries scalloped or cam wheel E, and a frame, C, as is customary in this class of machines.

D indicates a draft-tongue attached to the frame, which latter is advisably provided with ribs or plates between which the tongue fits, and by which it is prevented from working out of place or placing undue strain upon the fastening-bolts.

E indicates a scalloped or cam wheel keyed to the axle, or which may be either cast integral with or bolted to one of the ground-wheels A, as shown, the wheel at the stubble side of the machine being selected for this purpose, thereby obviating side draft.

As shown in Figs. 1 and 3, the periphery of wheel E is formed with a series of alternate points or projections and hollows or depressions graduated to the requisite number of strokes per revolution of wheel, and serves to give motion to a rocking lever, G, having a shaft, F, journaled in a slide, I, which is mounted in a suitable block or box, H, bolted to the frame C. Above and below the pivot F the rocking lever G is furnished with laterally-projecting studs or pins $a$, carrying anti-friction rollers $b$, which bear against the periphery of cam-wheel E, the elevated and depressed portions of which are so spaced in relation to the rollers $b$ (or the rollers $b$ are so spaced with reference to the projections and depressions of the cam-wheel) that as one roller rides over the crest of a projection the other occupies a position at the bottom of one of the depressions, and vice versa. In this way, or in consequence of this construction, the lever G is caused to rock or swing upon or with its shaft F, and its lower end is caused to move rapidly back and forth. Said lower end of rocking bar or lever G is connected by a link or pitman, M, to one arm of an elbow-lever, N, the other arm of which connects by a link or pitman, Q, to the knife or cutter bar. To permit the stroke to be varied as to length, the lever or bar G is provided with an oblong hole or series of holes, $c$, so that the link or pitman M may be attached nearer to or farther from the center of motion. To permit the rise and fall of the lever N with the cutting mechanism, the arm of said lever which connects with the link or pitman M is made cylindrical and passed through a circular hole or opening therein, where it is retained by a pin or other fastening device.

Figure 8:
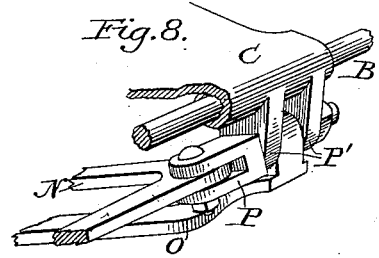

As shown in Fig. 8, the elbow-lever N is pivoted at the junction of its arms in the slotted or bifurcated head of a bolt, P, which passes loosely through lugs or ears P', formed upon or secured to the under side of the frame or axle, and through the upper end of a push or drag bar O, extending into the space between said lugs. By this arrangement the bolt P is made to serve not only as a pivot for the push or drag bar O, but also as a support and pivot or swivel for the elbow-lever N, enabling both to rise and fall together and from the same center of motion; hence without in any manner disturbing their relation one to the other.

At the lower end of the push or drag bar O is a ground wheel or roller, T, the axle of which is formed by a bolt, S, having an enlarged and bifurcated head, $d$, between the two arms of which the shoe R is hinged or pivoted by a bolt, $c$, as best shown in Fig. 1.

The finger-bar $V^2$ is attached to and supported by the shoe R, and cutter-bar V³ rests upon and moves over the finger-bar, as usual.

V indicates a hand-lever pivoted at the side of the frame C, and provided with a locking-bolt, Y, which engages with a notched sector or rack, Z, and serves to hold the lever at any desired adjustment. The lower end of the lever extends forward and downward from the pivot, and its extremity is connected by a chain, W, with the finger-bar V² at a point ouside of the pivot-bolt c, by which the finger-bar is supported and carried. If the lever be thrown backward so as to lift the chain, the cutting mechanism will be lifted bodily from the ground, the push-bar O swinging from bolt P as a center, and the weight of the finger-bar and cutter-bar being sufficient to prevent them from swinging up from bolt e as a center of motion so long as the bar O is free to rise. It often happens, however, that it is necessary or desirable only to lift the outer end of the cutting mechanism and to prevent the push-bar O from rising at such time and preventing the inner end of the cutting mechanism from rising. I therefore provide a latch-bar, X, which is pivoted at its lower end to the bar O, is formed with a series of notches, f, on its front face, and extends upward through an oblong slot in the frame C in position to be moved by the foot of the driver. This latch is hinged near the ground-wheel, giving it the proper inclination. The latch is normally drawn back by spring g, so that it may rise and fall freely through the opening in the frame, thus permitting the cutting mechanism and frame to adapt themselves freely to the undulations of the ground over which the machine travels. So long as the latch occupies this position any lifting force applied to the cutting mechanism through lever V will lift said mechanism from the bolt P as a center, thus raising the cutting mechanism and thrust-bar bodily from the ground. When, however, it becomes necessary to lift the cutting mechanism only, the driver presses with his foot against the latch-bar X, bringing its notched face in contact with the frame, thereby preventing bar O from being raised up, while the cutting mechanism proper can be raised to a perpendicular or substantially perpendicular position.

Z' indicates a hand-lever, the lower end of which is rigidly attached to the swivel-bolt S, by which the shoe and cutting mechanism are supported and carried. By moving the lever forward or backward the forward edge of the cutting mechanism may be depressed or elevated, as required, to cut closer to or higher from the ground.

The lever Z' carries a locking bolt or dog, V', which engages with a toothed rack or sector, X', and holds the lever, and consequently the cutting mechanism, at any desired adjustment.

Figure 4:
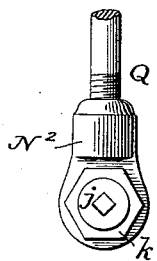
Figure 5:
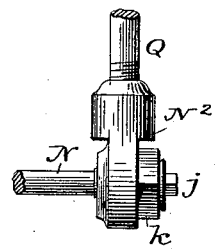
Figure 6:
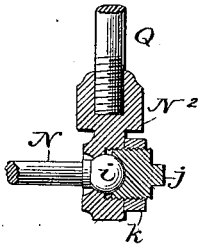
Figure 7:
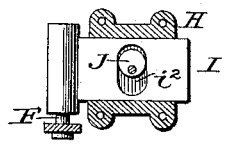

It is important, in order to permit free adjustment of the parts in the manner indicated, and to avoid cramping or binding, or the necessity of stopping the action of the cutting mechanism, that a joint be used to connect the elbow-lever N and the pitman Q, capable of motion in any and all directions. I therefore provide a ball-and-socket joint, which, broadly considered, is of course not new, but the special construction of which is believed to be novel. This joint or coupling is illustrated in Figs. 4, 5, and 6, in which N² indicates the socket-piece, formed with a hole of sufficient size to permit the cylindrical arm of lever N to pass through it, and to allow play of said arm to a considerable extent in all directions. The socket-piece is bored out to a diameter greater than that of the ball or head i of the arm of elbow-lever N, and is tapped to receive a plug, j, which is formed with a socket or seat to receive the ball or head i, and which screws into the socket-piece to complete the joint. The seat or opening in the socket-piece N² is made of such depth that the plug j bears upon the ball or head i before reaching the bottom of the socket, and thus an oil-space is provided, and room is left to permit the plug to be set up as required, to compensate for wear in the joint or coupling. A jam-nut, k, applied to the projecting portion of plug j, prevents it from working loose, and an oil-hole opening through socket-piece N² permits oil to be supplied to the oil-space in the coupling. The plug is formed with a polygonal head to receive a wrench or other tool by which to turn it.

It is desirable that means be provided whereby the cutting mechanism may be conveniently thrown out of action and out of gear with the driving-wheel, and held in position when so thrown out. Such means I supply by the arrangement illustrated in Figs. 1 and 7, in which the slide I, carrying the shaft F of rocking bar or lever G, is represented as provided with an elongated opening, i², the longer axis of which is transverse to the length of the slide I and at right angles to the direction in which the slide moves in the boxing H.

J indicates an eccentric seated in the opening i², and provided with a stem which projects centrally through the top of boxing H, above which it is furnished with a cross-piece, K. By turning the cross-piece and its stem the eccentric J is caused to move the slide longitudinally through the boxing H, and when thrown to the limit of its movement in front or in rear of the stem or axis of motion the eccentric locks said slide against movement by reason of pressure applied directly to the slide. When, therefore, the eccentric is turned to its limit in an inward direction, the slide, the shaft F, lever G, and its rollers are all carried toward the cam-wheel E, and the rollers are caused to bear upon and to be moved by said wheel, and when the eccentric is thrown to its limit in the opposite direction the parts are thrown and held out of gear, as will be readily understood.

It is obvious that instead of bifurcating the heads of bolts P and S, the parts which connect with and are pivoted in them may be bifurcated and the heads made to fit between the two arms. The two constructions are mere equivalents.

It is likewise apparent that the slide I may be moved by a screw, lever, or equivalent device, or held by a set-screw and adjusted by hand.

Having thus described my invention, what I claim is—

1. In a reaper or mowing-machine, the combination of cutter or knife bar V³, elbow-lever N, provided with ball or head $i$, and link or pitman Q, having piece N², provided with a screw-threaded socket, screw-plug $j$, fitting into said socket, and nut $k$, all substantially as shown and described.

2. In a reaping or mowing machine substantially such as described, the combination of a wheeled frame, C, a thrust-bar, O, carried by and descending from the frame or axle and provided with a ground-wheel, T, a bolt, S, passing through the wheel and bar and provided with an enlarged head, and a finger-bar hinged or pivoted in said enlarged head, all substantially as shown, whereby the single bolt is caused to serve as a support for the finger-bar, on which the latter may be raised and lowered lengthwise and tipped laterally, and also as an axle for the wheel T.

3. In a reaping or mowing machine substantially such as described and shown, the combination of a wheeled frame, a depending bar provided with a ground-wheel at its lower end, a bolt passing through said ground-wheel and through the depending bar, and provided with an enlarged head, a shoe and finger-bar pivotally attached to said head, and a lever attached to the bolt and serving to rock the same, and thereby vary the inclination of the shoe and its attached parts.

4. The combination of wheels A A and cam-wheel E, axle B, frame C, thrust-bar O, pivotally attached to the frame or axle, wheel T at the lower end of thrust-bar O, bolt S, shoe R, hinged to said bolt, and lever Z', attached to said bolt and provided with locking device V', and rack or sector X', attached to thrust-bar O, all substantially as described and shown.

5. The herein-described reaping or mowing machine, consisting of wheels A A and cam-wheel E, axle B, frame C, and tongue D, thrust-bar O, swivel-bolt P, supporting said bar, elbow-lever N, pivoted to said bolt-wheel T at the lower end of bar O, bolt S, passing through bar O, and wheel T, shoe R, carrying finger-bar V², and hinged to bolt S, cutter-bar V³, connected with elbow-lever N by a link or pitman, Q, rocking lever G, provided with studs or rollers to bear upon wheel E, and link or pitman M, connecting the levers G and N.

6. The combination, in a reaping or mowing machine such as described, of a wheeled frame, a depending bar, a swivel-bolt forming a pivotal connection between the depending bar and the wheeled frame, a swivel-bolt passing through the lower end of the bar, a shoe pivoted to said bolt and carrying the finger-bar, a cutter-bar sliding upon the finger-bar, a link pivotally connected with the cutter-bar, and an elbow-lever supported by a pivotal connection with the swivel-bolt which supports the depending bar, and having one arm connected with the link of the cutter-bar by a universal joint and the other arm connected with a rocking lever actuated by a cam-wheel.

GEORGE PYE.

Witnesses:
JAS. H. SCOTT,
GEO. P. BROPHY.